US008657143B2

(12) United States Patent
Walker

(10) Patent No.: US 8,657,143 B2
(45) Date of Patent: Feb. 25, 2014

(54) SMALL ENGINE FUEL TANK SYSTEMS AND MOUNTING METHODS

(75) Inventor: Christopher Todd Walker, Hillsborough, NC (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/445,480

(22) Filed: Apr. 12, 2012

(65) Prior Publication Data
US 2013/0270276 A1 Oct. 17, 2013

(51) Int. Cl.
*A01D 75/00* (2006.01)
*B23P 19/10* (2006.01)

(52) U.S. Cl.
USPC ............ 220/562; 29/525.01; D15/17; 56/17.4

(58) Field of Classification Search
USPC .................. 220/592, 562, 23.83, 694, 326; 29/525.01; 123/195 C; 206/0.6; 56/17.4; 248/220.22, 680–681; D15/17, 14; 24/573.09, 545; 137/377, 137/899, 351
IPC ....................................................... B60K 15/07
See application file for complete search history.

(56) References Cited

U.S. PATENT DOCUMENTS

| 2,095,340 | A | * | 10/1937 | Meyer ............................... 24/198 |
| 2,938,252 | A | * | 5/1960 | Scheemaeker ................ 24/67.9 |
| 3,529,653 | A | * | 9/1970 | Fey, Jr. ....................... 160/374.1 |
| 3,842,981 | A | * | 10/1974 | Lambert ......................... 211/74 |
| 4,068,353 | A | * | 1/1978 | Speers et al. ................... 24/545 |
| 4,566,157 | A | * | 1/1986 | Packendorff .................... 24/536 |
| 4,793,396 | A | * | 12/1988 | Anderson et al. .......... 160/84.02 |
| 4,846,499 | A | * | 7/1989 | Izumi et al. .................... 280/830 |
| 5,015,421 | A | * | 5/1991 | Messner ...................... 261/122.1 |
| 5,033,216 | A | * | 7/1991 | Gandy et al. .................... 40/603 |
| 5,197,426 | A | * | 3/1993 | Frangesch et al. ......... 123/198 E |
| 5,199,140 | A | * | 4/1993 | Valiulis et al. .................. 24/545 |
| 5,214,825 | A | * | 6/1993 | Hirzel ............................. 24/67.9 |
| 5,328,049 | A | * | 7/1994 | Ritzow .......................... 220/315 |
| 5,522,457 | A | * | 6/1996 | Lenz ............................. 165/121 |
| 5,697,127 | A | * | 12/1997 | Tyler ............................... 24/3.7 |
| 5,787,556 | A | * | 8/1998 | Terzian .......................... 24/545 |
| 5,885,533 | A | * | 3/1999 | Savage et al. ................. 422/555 |

(Continued)

FOREIGN PATENT DOCUMENTS

| FR | 2785576 | * | 5/2000 | .......... B60K 15/067 |
| JP | 06108869 A | | 4/1994 | |
| JP | 2002021576 A | | 1/2002 | |
| JP | 2008037230 | * | 2/2008 | ............. B60K 15/03 |

*Primary Examiner* — J. Gregory Pickett
*Assistant Examiner* — Mollie Llewellyn
(74) *Attorney, Agent, or Firm* — Jenkins, Wilson, Taylor & Hunt, P.A.

(57) ABSTRACT

The present subject matter relates to systems and methods for coupling a fuel tank assembly to a combustion engine in which a cover configured for covering at least a portion of the combustion engine can include a recess configured for receiving a fuel tank therein. The recess can include a receptacle positioned against an inner wall of the cover and configured for receiving a protruding ear of the fuel tank, a first protruding tab extending from the inner wall of the cover at or near the receptacle, and a latch strike extending from the inner wall of the cover at or near the receptacle. A retaining clip with a first retaining portion and a latch arm can be positioned in a blocking position with respect to the receptacle to prevent the protruding ear of the fuel tank from being removed from the receptacle.

14 Claims, 4 Drawing Sheets

(56) References Cited

U.S. PATENT DOCUMENTS

| | | | |
|---|---|---|---|
| 6,049,963 A * | 4/2000 | Boe .................................. 29/525.01 |
| 6,216,734 B1 * | 4/2001 | Umetsu et al. ............ 137/565.24 |
| 6,477,751 B2 * | 11/2002 | Baumdicker et al. ............ 24/559 |
| 6,523,507 B2 * | 2/2003 | Schmitz et al. ............. 123/41.55 |
| 6,571,898 B2 * | 6/2003 | Guyomard ..................... 180/68.4 |
| 6,905,042 B2 | 6/2005 | Eberhardt et al. |
| 6,917,121 B2 | 7/2005 | Akimoto et al. |
| 7,069,625 B2 * | 7/2006 | Liu .............................. 24/573.09 |
| 7,140,507 B2 * | 11/2006 | Maldonado et al. ......... 220/592.2 |
| 7,225,765 B2 | 6/2007 | Leech et al. |
| 7,325,592 B2 * | 2/2008 | Cristante et al. ............... 165/121 |
| 7,373,940 B1 * | 5/2008 | Lloyd ............................. 132/278 |
| 7,389,608 B1 * | 6/2008 | MacKay ............................ 43/57 |
| 7,654,410 B2 * | 2/2010 | Prince et al. .................... 220/564 |
| 7,686,180 B1 * | 3/2010 | MacDonald et al. ....... 220/23.83 |
| 7,757,365 B2 * | 7/2010 | Ouellette .......................... 29/410 |
| 8,074,325 B2 * | 12/2011 | Gerfast ............................. 24/67.9 |
| 2003/0015536 A1 | 1/2003 | Tekulve et al. |
| 2005/0180850 A1 * | 8/2005 | Kato ................................ 415/220 |
| 2007/0295722 A1 * | 12/2007 | Titas et al. .................... 220/23.83 |
| 2008/0099641 A1 * | 5/2008 | Best et al. ................... 248/220.22 |
| 2009/0293837 A1 * | 12/2009 | Ito et al. ...................... 123/198 R |
| 2010/0095925 A1 | 4/2010 | Sotiriades |
| 2011/0057997 A1 * | 3/2011 | Takeuchi ........................... 347/86 |
| 2011/0127761 A1 * | 6/2011 | Yoshizawa et al. ............ 280/834 |

* cited by examiner

SMALL ENGINE FUEL TANK SYSTEMS AND MOUNTING METHODS

TECHNICAL FIELD

The subject matter disclosed herein relates generally to a fuel tank for combustion engine. More particularly, the subject matter disclosed herein relates to the assembly and connection of a fuel tank within a small engine.

BACKGROUND

When used in applications such as walk-behind lawn mowers and snow throwers, small, one or two-cylinder engines often have a fuel tank mounted thereon. The fuel tank is usually positioned to the outside of most other components so that it is easily accessible for filling. When components hidden by the fuel tank need servicing, however, the tank will often need to be removed. Thus, the structure and method for attaching the fuel tank to the mower should afford easy removal.

On the other hand, the attachment structure and method should securely and reliably hold the tank in the desired position. To ensure that the fuel tank remains tightly secured to its engine, however, some methods of attachment are complex, costly and difficult or awkward to assemble. Specifically, for example, one prior art arrangement for a fuel tank with respect to surrounding components is shown in FIGS. 1-2B. As shown in FIGS. 1-2B, a cover or shroud 10 can be configured for receiving a fuel tank 20 therein. Specifically, fuel tank 20 can comprise a fuel line 22 and a protruding ear 24, and cover 10 can comprise a recess into which fuel tank 20 can be positioned and a retainer shape 12 that can engage protruding ear 24 to hold fuel tank 20 in place.

To assemble this system, fuel tank 20 must be inserted such that protruding ear 24 can pass around retainer shape 12, and then fuel tank 20 must be twisted into a position in which protruding ear 24 is aligned with retainer shape 12 (i.e., so that fuel tank 20 cannot be pulled straight out). To maintain fuel tank 20 in this position, a retaining clip 30 can be used to couple protruding ear 24 to retainer shape 12. For example, as shown in FIGS. 2A and 2B, retaining clip 30 can comprise a substantially U-shaped clip having two opposing legs that can surround and engage both of protruding ear 24 and retainer shape 12 (See, e.g., FIG. 2B).

Although this process can result in the fuel tank being securely yet removably connected to the surrounding components, the requirement that the fuel tank be maneuvered around the elements of the cover before being secured in place by the retainer clip means more process time can be required for this method. As a result, the process can be difficult to automate, and thus it is generally done by hand.

Accordingly, there exists a need for systems and methods for secure yet removable coupling of a fuel tank assembly to a combustion engine that do not require complex or costly connections that are difficult or awkward to perform.

SUMMARY

In accordance with this disclosure, systems and methods for coupling a fuel tank to an engine of a power machine (e.g., a lawnmower) are provided. In one aspect, a system for coupling a fuel tank assembly to a combustion engine is provided. The system can comprise a fuel tank comprising at least one protruding ear and a cover configured for covering at least a portion of a combustion engine. The cover can comprise a recess configured for receiving the fuel tank therein, wherein the recess comprises a receptacle positioned against an inner wall of the cover and configured for receiving the protruding ear, a first protruding tab extending from the inner wall of the cover at or near the receptacle, and a latch strike extending from the inner wall of the cover at or near the receptacle. The system can further comprise a retaining clip comprising a first retaining portion and a latch arm, wherein the first retaining portion is configured for engagement with the first protruding tab to secure the protruding ear of the fuel tank in the receptacle, and wherein the latch arm is configured for engaging the latch strike to prevent movement of the retaining clip relative to the receptacle.

In another aspect, a retaining clip for coupling a fuel tank assembly to a combustion engine is provided. The retaining clip can comprise a first retaining portion configured for engagement with a first protruding tab extending from an inner wall of a cover to secure a protruding ear of a fuel tank in a receptacle positioned against the inner wall of the cover. The retaining clip can further comprise a latch arm configured for engaging a latch strike extending from the inner wall of the cover to prevent movement of the retaining clip relative to the receptacle.

In yet another aspect, a method for coupling a fuel tank assembly to a combustion engine is provided. The method can comprise providing a cover configured for covering at least a portion of a combustion engine, the cover comprising a recess, a receptacle positioned within the recess against and inner wall of the cover, a first protruding tab positioned at or near the receptacle, and a latch strike positioned at or near the receptacle. The method can further comprise positioning a fuel tank within the recess, the fuel tank comprising a protruding ear configured for positioning in the receptacle, and positioning a retaining clip having a first retaining portion and a latch arm in a blocking position with respect to the receptacle, wherein the first retaining portion is positioned in engagement with the first protruding tab, and wherein the latch arm is configured for engaging the latch strike to prevent movement of the retaining clip relative to the receptacle. In this way, the retaining clip can prevent the protruding ear of the fuel tank from being removed from the receptacle.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
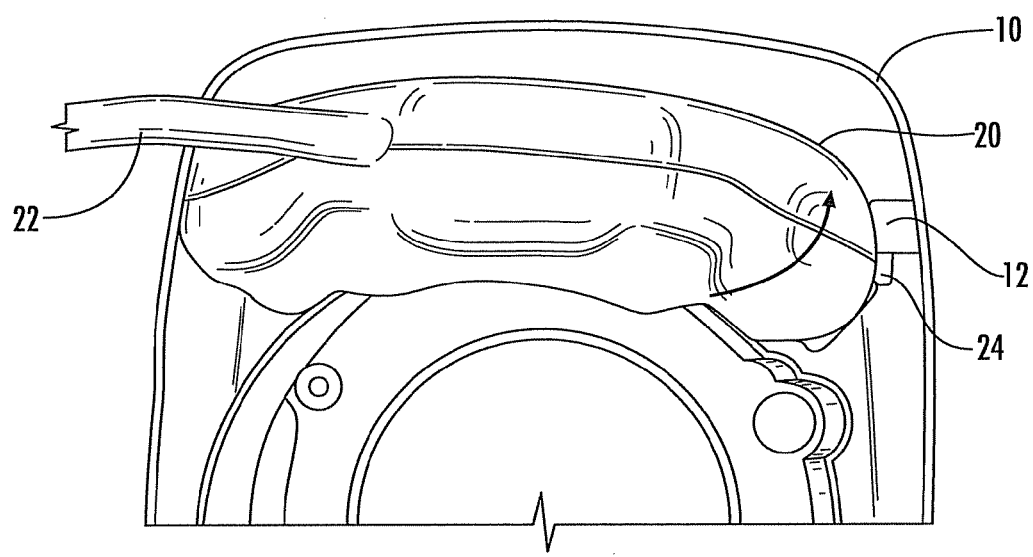
FIG. 1 is a top view of a system for securing a fuel tank to surrounding components associated with a combustion engine according to a known configuration.
Figure 2A:
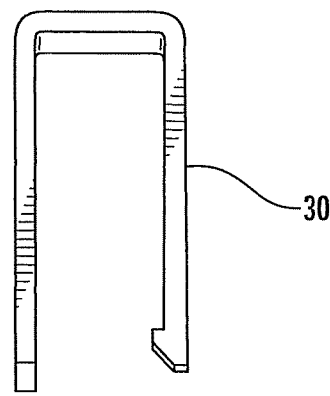
FIG. 2A is a side view of a retaining clip for securing a fuel tank in place in the system shown in FIG. 1.
Figure 2B:
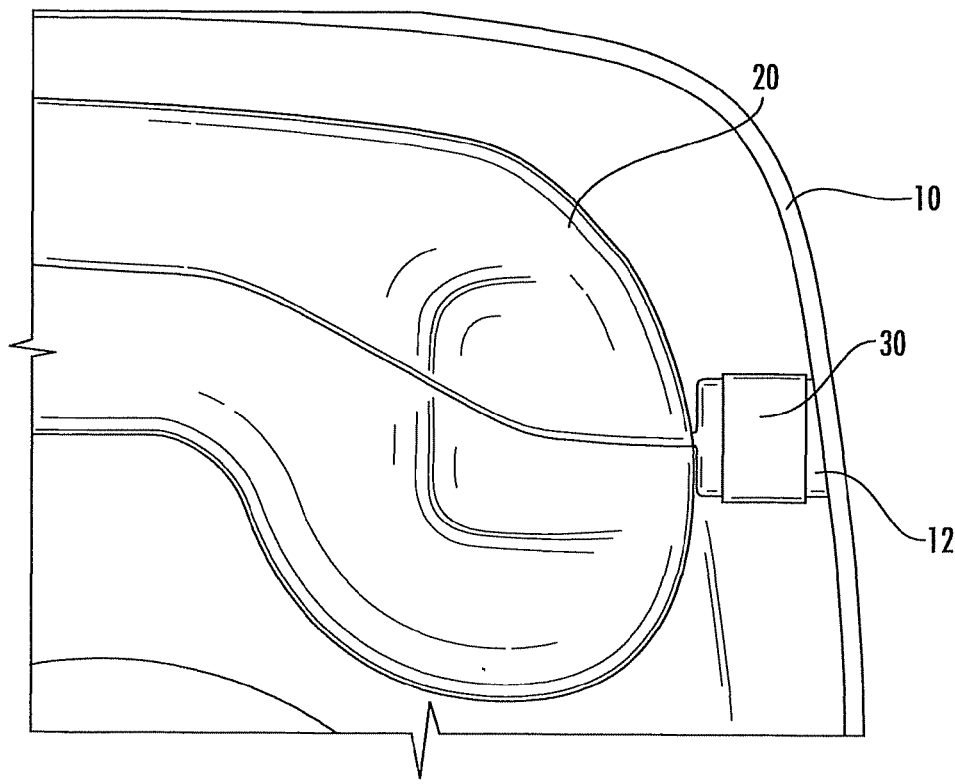
FIG. 2B is a tip view of the retaining clip shown in FIG. 2A positioned within the system shown in FIG. 1.
Figure 3:
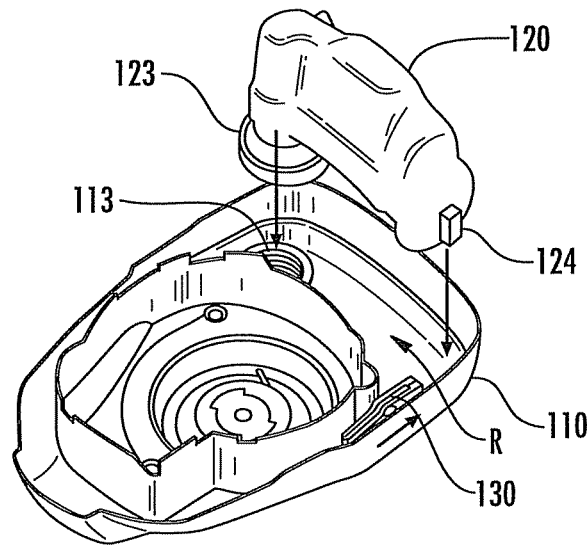
FIG. 3 is a perspective view of a system for securing a fuel tank to surrounding components associated with a combustion engine according to an embodiment of the presently disclosed subject matter.

The present subject matter provides methods and devices for coupling a fuel tank to an engine of a power machine, such as for example and without limitation a lawnmower. In one aspect, the present subject matter provides a system for coupling a fuel tank assembly to a combustion engine. The system can comprise a fuel tank 120 and a cover or shroud, generally designated 110, which can serve to both shield an operator from moving components of the engine and at least partially muffle the noise generated by the engine. As illustrated in FIG. 3, cover 110 can be configured for covering at least a portion of a combustion engine and can comprise a recess R configured for receiving fuel tank 120 therein.

In particular, fuel tank 120 can comprise a fill neck 123, and recess R can comprise an opening 113 through or in cover 110 that is configured for receiving fill neck 123 therethrough. In addition, fuel tank 120 can comprise at least one protruding ear 124 that can extend from a side of fuel tank 120, and recess R can comprise a receptacle 111 (FIG. 4A) positioned against an inner wall of cover 110 and configured for receiving protruding ear 124. Specifically, receptacle 111 can comprise a plurality of walls extending from the inner wall of cover 110 that can be sized and shaped to receive and cradle protruding ear 124, but receptacle 111 can further have an open end that faces out of recess R such that fuel tank 120 can be easily inserted into recess R by sliding protruding ear 124 into receptacle 111 in a single, substantially linear motion.

Figure 4A:
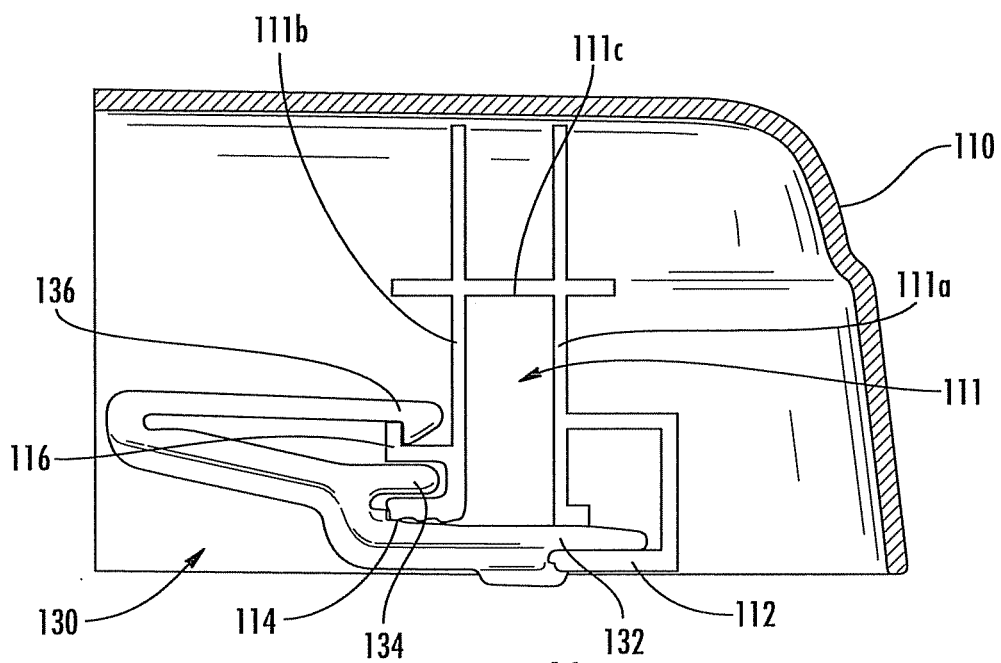
FIGS. 4A and 4B are side views of a retaining clip for securing a fuel tank in place with respect to surrounding components associated with a combustion engine according to an embodiment of the presently disclosed subject matter.
Figure 4B:
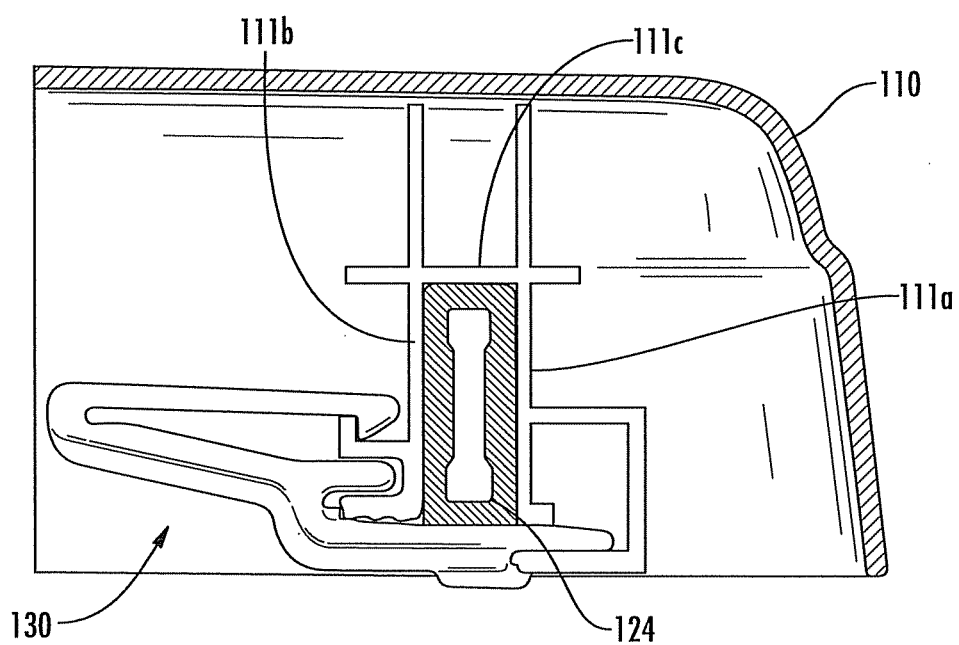

As shown in FIGS. 4A and 4B, for example, receptacle 111 can be defined by first and second side walls 111a and 111b, respectively, (e.g., substantially parallel to each other) and an end wall 111c. In this arrangement, receptacle 111 can have an unblocked end opposite end wall 111c such that, as fuel tank 120 is inserted into recess R, protruding ear 124 can slide between first and second side walls 111a and 111b until it reaches end wall 111c such that protruding ear 124 is effectively restrained from movement in three directions (i.e., laterally within cover 110 and in a direction into recess R). Although reference is made herein to "walls", those having skill in the art should recognize that other structures (e.g., pegs) can be used to limit the movement of protruding ear 124 with respect to cover 110.

To completely restrain fuel tank 120, the unblocked end of receptacle 111 can be blocked after protruding ear 124 is positioned amidst first side wall 111a, second side wall 111b, and end wall 111c. To this end, the system can further comprise a retaining clip, generally designated 130 in FIGS. 3-4A, configured for sealing the unblocked end of receptacle 111 and thus restraining protruding ear 124, which can thereby secure fuel tank 120 in place within recess R. Specifically, retaining clip 130 can comprise a first retaining portion 132 designed to interact with surface features of cover 110 within recess R. In particular, for example, recess R can comprise a first protruding tab 112 extending from the inner wall of cover 110 at or near receptacle 111, and first retaining portion 132 can be sized and shaped for engagement with first protruding tab 112 (e.g., between first protruding tab 112 and receptacle 111).

For example, as shown in FIGS. 4A and 4B, first protruding tab 112 can be positioned a small distance away from an end of first side wall 111a that is opposite end wall 111c. In this configuration, first retaining portion 132 can be designed to extend across the open end of receptacle 111 and fit between first protruding tab 112 and the end of first side wall 111a. As a result, as shown in FIG. 4B, first retaining portion 132 can block the open end of receptacle 111 to maintain protruding ear 124 in position within receptacle 111. If an attempt is made to remove protruding ear 124 from receptacle 111, first retaining portion 132 can brace against first protruding tab 112 to resist the removal of protruding ear 124.

Retaining clip 130 can further comprise a second retaining portion 134 designed to interact with surface features of cover 110. In particular, for example, recess R in cover 110 can comprise a second protruding tab 114 extending from the inner wall of cover 110 at or near receptacle 111. As shown in FIGS. 4A and 4B, for example, second protruding tab 114 can be positioned at or near an end of second side wall 111b that is opposite end wall 111c. If second retaining portion 134 is positioned adjacent to second protruding tab 114 on a side of second protruding tab 114 nearest to end wall 111c (i.e., adjacent to second protruding tab 114 on a side away from the open end of receptacle 111), second retaining portion 134 can work with first retaining portion 132 to resist removal of protruding ear 124 by bracing against second protruding tab 114.

By way of example and without limitation, a particular configuration of retaining clip 130 is shown in FIGS. 4A and 4B. In this configuration, first retaining portion 132 and second retaining portion 134 can be provided as two "prongs" extending from a the body of retaining clip 130 and configured for securing the open end of receptacle 111. Namely, first retaining portion 132 can extend past second protruding tab 114 across the open end of receptacle 111, with its end being positioned at or near first protruding tab 112, and second retaining portion 134 can be positioned at or near second protruding tab 114. With respect to the orientation of the elements shown in FIGS. 4A and 4B, this arrangement is shown as first retaining portion 132 passing below second protruding tab 114 and the open end of receptacle 111, with its distal end being positioned above first protruding tab 112, and second retaining portion 134 being positioned above second protruding tab 114. In this arrangement, second protruding tab 114 can thus be positioned between first and second retaining portions 132 and 134, which can help both to align retaining clip 130 with respect to receptacle 111 and to hold retaining clip 130 in place (e.g., by first and second retaining portions 132 and 134 essentially gripping either side of second protruding tab 114). Regardless of the specific configuration of these elements, however, the general principle can be for first retaining portion 132 and second retaining portion 134 to engage first protruding tab 112 and second protruding tab 114, respectively, on opposite sides of the open end of receptacle 111 (i.e., the end opposing end wall 111c) to close the space defined by receptacle 111 and thus enable protruding ear 124 to be securely retained within receptacle 111.

To maintain retaining clip 130 in this blocking position in which first retaining portion 132 extends across the open end of receptacle 111, retaining clip 130 can further comprise a latch arm 136 designed to likewise interact with surface features of cover 110. Specifically, latch arm 136 can be configured to interact with a latch strike 116 extending from the inner wall of cover 110. As shown in FIGS. 4A and 4B, for example, latch strike 116 can be positioned at or near second side wall 111b of receptacle 111 and can be configured for engaging with latch arm 136. In this regard, latch arm 136 can comprise a substantially hook-shaped end, and latch strike 116 can be shaped to have a ledge that can be grasped by the hook-shaped end of latch arm 136. In this way, latch arm 136 can be moved into engagement with latch strike 116 to prevent the movement of retaining clip 130 relative to receptacle 111. With respect to the configuration shown in FIGS. 4A and 4B, for example, latch arm 136 can couple with latch strike 116 to prevent movement of retaining clip 130 such that first retaining portion 132 is moved out of a blocking position with respect to receptacle 111 (i.e., to the left in FIGS. 4A and 4B).

Thus, when combined with the constraint on movement provided by the interaction of first retaining portion 132 with first protruding tab 112 (and the interaction of second retaining portion 134 with second protruding tab 114, if present), this engagement of latch arm 136 with latch strike 116 can function to maintain retaining clip 130 in a substantially fixed position to thereby lock protruding ear 124 within receptacle 111. If it is desired, however, to remove fuel tank 120 from recess R, latch arm 136 can be moved out of engagement with latch strike 116, thereby allowing retaining clip 130 to be moved away from receptacle 111. Specifically, for example, latch arm 136 can comprise a flexible cantilevered arm that can be flexed with respect to the body of retainer clip 130 to move the hooked end portion of latch arm 136 out of engagement with the flanged shape of latch strike 116, thereby allowing retainer clip 130 to be withdrawn.

Regardless of the specific components or configuration used, however, systems according to the presently disclosed subject matter can be designed such that fuel tank 120 can be attached by sliding it into position in a single, direct and non-twisting motion to attach, place, or mount it in position. For instance, using the system disclosed above, fuel tank 120 can be easily yet securely coupled to cover 110 (and thus to other connected components). Specifically, for example, a method for coupling fuel tank 120 to cover 110 can comprise positioning fuel tank 120 within recess R of cover 110 such that fill neck 123 is positioned through opening 113 and protruding ear 124 is positioned in receptacle 111 (e.g., inserted through the open end of receptacle 111). Specifically, receptacle 111 can be configured such that inserting protruding ear 124 can be accomplished in a single, substantially linear motion in a first direction (e.g., into recess R). Thus, if cover 110 is inverted as shown in FIG. 3, fuel tank 120 can be lowered into recess R in a single downward motion that both positions fill neck 123 in opening 113 and slides protruding ear 124 into receptacle 111. Because this insertion can be completed in a single direct motion (i.e., fuel tank 120 does not need to be twisted into position), this step can be automated using systems and methods suitable such that this assembly does not have to, but can, be performed manually.

Once fuel tank 120 is positioned in recess R in this way, it can be fixed in place. For example, retainer clip 130 can be positioned to secure protruding ear 124 within receptacle 111. Specifically, retainer clip 130 can slide into a position where first retaining portion 132 is positioned across an open end of receptacle 111, with an end of first retaining portion 132 at or near first protruding tab 112. As shown in FIG. 3, the motion of retainer clip 130 to slide into position can be in a second direction that can be substantially perpendicular to the first direction in which protruding ear 124 is inserted into receptacle 111 (i.e., in a lateral direction within recess R along the inner wall of cover 110). Furthermore, second retaining portion 134 can positioned at or near second protruding tab 114, and latch arm 136 can be snapped onto or otherwise positioned in engagement with latch strike 116. Because this positioning of retainer clip 130 can be done in a single, substantially linear motion, this step of the method can likewise be automated or performed manually.

The present subject matter can be embodied in other forms without departure from the spirit and essential characteristics thereof. The embodiments described therefore are to be considered in all respects as illustrative and not restrictive.

Although the present subject matter has been described in terms of certain preferred embodiments, other embodiments that are apparent to those of ordinary skill in the art are also within the scope of the present subject matter.

What is claimed is:

1. A fuel tank assembly system comprising:
  a fuel tank comprising at least one protruding ear;
  a cover configured for covering at least a portion of a combustion engine, the cover comprising a recess configured for receiving the fuel tank therein, wherein the recess comprises:
    a receptacle positioned against an inner wall of the cover and configured for receiving the protruding ear;
    a first protruding tab extending from the inner wall of the cover at or near the receptacle; and
    a latch strike extending from the inner wall of the cover at or near the receptacle; and
  a retaining clip comprising a first retaining portion and a latch arm, wherein the first retaining portion is configured for engagement with the first protruding tab to secure the protruding ear of the fuel tank in the receptacle, and wherein the latch arm is configured for engaging the latch strike to prevent movement of the retaining clip relative to the receptacle.

2. The system of claim 1, wherein the fuel tank comprises a fill neck; and
  wherein the cover comprises an opening through the cover configured for receiving the fill neck therethrough.

3. The system of claim 1, wherein the receptacle comprises a plurality of walls extending from the inner wall of the cover.

4. The system of claim 3, wherein the receptacle comprises first and second side walls and an end wall.

5. The system of claim 4, wherein the first retaining portion is configured to extend across an open end of the receptacle between the first and second side walls.

6. The system of claim 1, wherein the cover comprises a second protruding tab positioned at or near the receptacle; and
  wherein the retaining clip comprises a second retaining portion configured for engagement with the second protruding tab to secure the protruding ear of the fuel tank in the receptacle.

7. A method for attaching a fuel tank assembly, the method comprising:
  providing a cover configured for covering at least a portion of a combustion engine, the cover comprising a recess configured for receiving a fuel tank therein, a receptacle positioned within the recess against an inner wall of the cover, a first protruding tab extending from the inner wall of the cover at or near the receptacle, and a latch strike extending from the inner wall of the cover at or near the receptacle;
  sliding a fuel tank into position with respect to surrounding components in a non-twisting motion by positioning at least a portion of the fuel tank within the recess, the fuel tank comprising a protruding ear configured for positioning in the receptacle; and
  securing the fuel tank in the position with respect to the surrounding components by positioning a retaining clip having a first retaining portion and a latch arm in a blocking position with respect to the receptacle, wherein the first retaining portion is positioned in engagement with the first protruding tab to secure the protruding ear of the fuel tank in the receptacle, and wherein the latch arm is configured for engaging the latch strike to prevent movement of the retaining clip relative to the receptacle, whereby the retaining clip prevents the protruding ear of the fuel tank from being removed from the receptacle.

8. The method of claim 7, wherein positioning the fuel tank within the recess comprises moving the protruding ear into the receptacle through an open end of the receptacle; and wherein securing the fuel tank in place comprises blocking the open end.

9. The method of claim 7, wherein the fuel tank comprises a fill neck, and the cover comprises an opening through the cover; and wherein positioning the fuel tank within the recess comprises positioning the fill neck through the opening.

10. The method of claim 7, wherein positioning the fuel tank within the recess comprises moving the protruding ear in a substantially linear first direction into the receptacle.

11. The method of claim 10, wherein positioning the retaining clip in a blocking position with respect to the receptacle comprises moving the retaining clip in a substantially linear second direction.

12. The method of claim 11, wherein the second direction is substantially perpendicular to the first direction.

13. The method of claim 7, wherein positioning the retaining clip in a blocking position with respect to the receptacle comprises positioning the retaining portion between the first protruding tab and the receptacle.

14. The method of claim 7, wherein the cover comprises a second protruding tab positioned at or near the receptacle, and the retaining clip comprises a second retaining portion; and wherein positioning the retaining clip in a blocking position with respect to the receptacle comprises positioning the second retaining portion in engagement with the second protruding tab.

* * * * *